United States Patent
Guo et al.

(10) Patent No.: US 11,797,013 B2
(45) Date of Patent: Oct. 24, 2023

(54) COLLISION AVOIDANCE METHOD AND MOBILE MACHINE USING THE SAME

(71) Applicants: UBTECH NORTH AMERICA RESEARCH AND DEVELOPMENT CENTER CORP, Pasadena, CA (US); UBTECH ROBOTICS CORP LTD, Shenzhen (CN)

(72) Inventors: Dejun Guo, Pasadena, CA (US); Kang-Hao Peng, Pasadena, CA (US); Dan Shao, Pasadena, CA (US); Yang Shen, Los Angeles, CA (US); Huan Tan, Pasadena, CA (US)

(73) Assignees: UBTECH NORTH AMERICA RESEARCH AND DEVELOPMENT CENTER CORP, Pasadena, CA (US); UBTECH ROBOTICS CORP LTD, Shenzhen (CN)

( * ) Notice: Subject to any disclaimer, the term of this patent is extended or adjusted under 35 U.S.C. 154(b) by 439 days.

(21) Appl. No.: 17/134,219

(22) Filed: Dec. 25, 2020

(65) Prior Publication Data
US 2022/0206499 A1    Jun. 30, 2022

(51) Int. Cl.
G05D 1/02    (2020.01)

(52) U.S. Cl.
CPC ......... *G05D 1/0214* (2013.01); *G05D 1/0223* (2013.01); *G05D 1/0238* (2013.01); *G05D 1/0257* (2013.01)

(58) Field of Classification Search
CPC .. G05D 1/0214; G05D 1/0223; G05D 1/0238; G05D 1/0257; G05D 1/0246
See application file for complete search history.

(56) References Cited

U.S. PATENT DOCUMENTS

| | | | |
|---|---|---|---|
| 2009/0052740 A1* | 2/2009 | Sonoura | G06V 10/24 901/1 |
| 2022/0219323 A1* | 7/2022 | Wuensch | B25J 9/162 |

FOREIGN PATENT DOCUMENTS

| | | |
|---|---|---|
| CN | 105955303 A | 9/2016 |
| CN | 110928283 A | 3/2020 |

OTHER PUBLICATIONS

ISR for PCT/CN2021/127836.
Written opinions of ISA for PCT/CN2021/127836.

* cited by examiner

*Primary Examiner* — Abby Y Lin
*Assistant Examiner* — Renee LaRose

(57) ABSTRACT

Collision avoidance for a mobile machine having a plurality of sensors is disclosed. The mobile machine is avoided from colliding with a collision object by fusing sensor data received from the plurality of sensors to obtain a plurality of data points corresponding to the collision object, calculating a closed-form solution of a distance between the mobile machine and each of the plurality of data points, calculating a maximum allowed velocity of the mobile machine based on the shortest distance between the mobile machine and the plurality of data points and a current velocity of the mobile machine, and controlling the mobile machine to move according to the maximum allowed velocity.

20 Claims, 12 Drawing Sheets

COLLISION AVOIDANCE METHOD AND MOBILE MACHINE USING THE SAME

BACKGROUND

1. Technical Field

The present disclosure relates to collision avoidance, and particularly to a collision avoidance method and a mobile machine using the same.

2. Description of Related Art

Robots can work in an autonomous or semi-autonomous manner to perform, for example, autonomous navigation and self-driving. Because there are various kinds of robots such as housework robots, cooking robots, and early education robots to be used in the daily life without the supervision of humans, safety is an important topic for the design of these robots.

Collision avoidance is one of the most important means to guarantee their safety of use, especially for mobile robots such as humanoid robots, sweeper robots and self-driving cars that often move on the ground automatically, because there are inevitably some obstacles on the ground such as garbage, stones, vehicles, and humans that will cause collisions and affect the movement of mobile robots on the ground.

Among existing collision avoidance technologies, there is a control method for a robot to realize collision avoidance by detecting distance from an obstacle using a distance sensor and identifying a danger area based on the distance. Next, a safe speed for the robot to move in the danger area without colliding with the obstacle is determined. However, the forgoing control method usually has the disadvantages of being insensitive in detecting small objects, transparent objects and opaque objects, and being slow in calculating the distance, which affects collision avoidance and braking of the robot much.

BRIEF DESCRIPTION OF THE DRAWINGS

In order to more clearly illustrate the technical solutions in this embodiment, the drawings used in the embodiments or the description of the prior art will be briefly introduced below. In the drawing(s), like reference numerals designate corresponding parts throughout the figures. It should be understood that, the drawings in the following description are only examples of the present disclosure. For those skilled in the art, other drawings can be obtained based on these drawings without creative works.

DETAILED DESCRIPTION

Figure 1A:
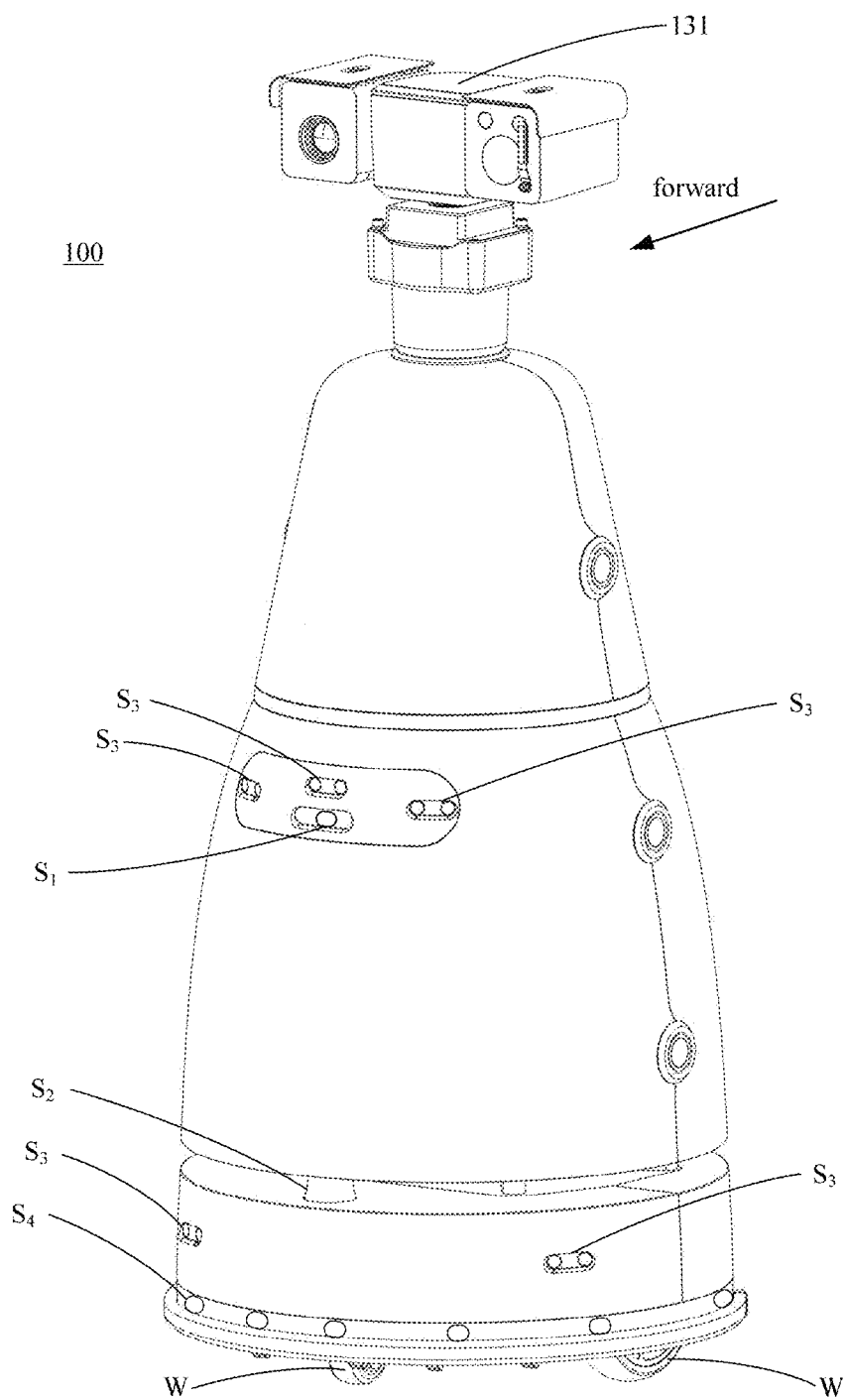
FIG. 1A is a perspective view of a mobile machine according to some embodiments of the present disclosure.

In order to make the objects, features and advantages of the present disclosure more obvious and easy to understand, the technical solutions in this embodiment will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including", "comprising", "having" and their variations indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

In the present disclosure, the terms "first", "second", and "third" are for descriptive purposes only, and are not to be comprehended as indicating or implying the relative importance or implicitly indicating the amount of technical features indicated. Thus, the feature limited by "first", "second", and "third" may include at least one of the feature either explicitly or implicitly. In the description of the present disclosure, the meaning of "a plurality" is at least two, for example, two, three, and the like, unless specifically defined otherwise.

In the present disclosure, the descriptions of "one embodiment", "some embodiments" or the like described in the specification mean that one or more embodiments of the present disclosure can include particular features, structures, or characteristics which are related to the descriptions of the descripted embodiments. Therefore, the sentences "in one embodiment", "in some embodiments", "in other embodiments", "in other embodiments" and the like that appear in different places of the specification do not mean that described embodiments should be referred by all other embodiments, but instead be referred by "one or more but not all other embodiments" unless otherwise specifically emphasized.

The present disclosure relates to collision avoidance for a mobile machine. As used herein, the term "collision avoidance" refers to prevent or reduce the severity of a collision, the term "mobile machine" refers to a machine such as a vehicle or a mobile robot that has the capability to move around in its environment, and the term "navigation" refers to the process of monitoring and controlling the movement of a mobile machine from one place to another. The term "sensor" refers to a device, module, machine, or subsystem such as ambient light sensor and image sensor whose purpose is to detect events or changes in its environment and send the information to other electronics (e.g., processor), and the term "fusion" for sensors refers to the process of integrating multiple sensors to produce more consistent, accurate, and useful information than that provided by any individual sensor.

Figure 1B:
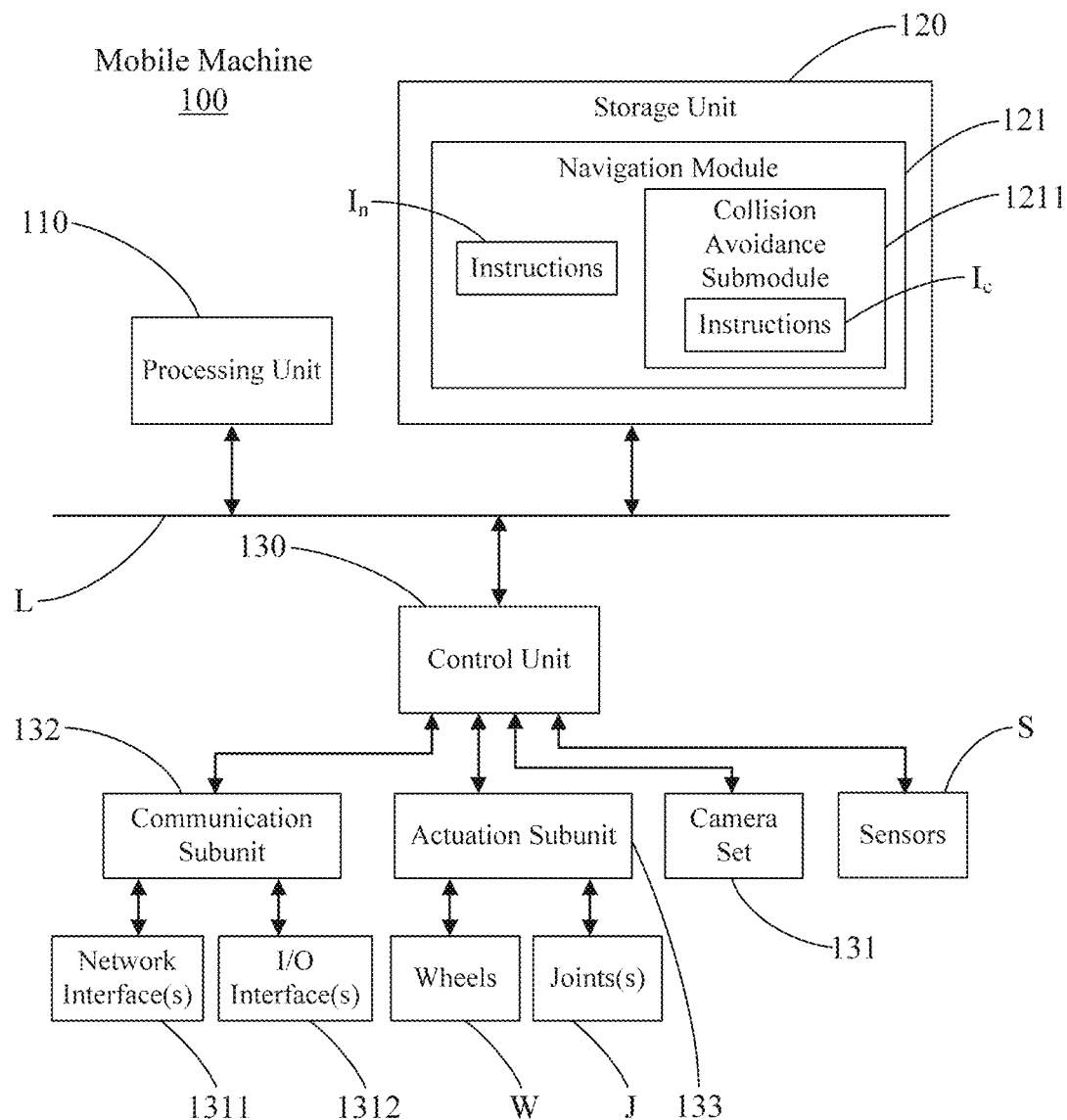
FIG. 1B is a schematic block diagram illustrating the mobile machine of FIG. 1A.

FIG. 1A is a perspective view of a mobile machine 100 according to some embodiments of the present disclosure; and FIG. 1B is a schematic block diagram illustrating the mobile machine 100 of FIG. 1A. The mobile machine 100 may be a mobile robot such as a wheeled robot, which may include a processing unit 110, a storage unit 120, and a control unit 130 that communicate over one or more communication buses or signal lines L. It should be noted that, the mobile machine 100 is only one example of mobile machine, and that the device 100 may have more or fewer components (e.g., unit, subunits, and modules) than shown in above or below, may combine two or more components, or may have a different configuration or arrangement of the components.

The processing unit 110 executes various (sets of) instructions stored in the storage unit 120 that may be in form of software programs to perform various functions for the mobile machine 1000 and to process related data, which may include one or more processors (e.g., CPU). The storage unit 120 may include one or more memories (e.g., high-speed random access memory and non-transitory memory), one or more memory controllers, and one or more non-transitory computer readable storage mediums (e.g., solid-state drive (SSD)). The control unit 130 may include various controllers (e.g., camera controller, display controller, and physical button controller) and peripherals interface for coupling the input and output peripheral of the mobile machine 100, for example, external port (e.g., USB), wireless communication circuit (e.g., RF communication circuit), audio circuit (e.g., speaker circuit), sensor (e.g., RGB-D camera, LiDAR, and accelerometer), and the like, to the processing unit 110 and the storage unit 120.

The storage unit 120 may include a navigation module 121 which may be stored in the one or more memories (and the one or more non-transitory computer readable storage mediums). The navigation module 121 may be a software module having instructions $I_n$ for implementing the navigation of the mobile machine 100 and a collision avoidance submodule 1211. The collision avoidance submodule 1211 may be a software module having instructions $I_c$ for implementing the collision avoidance of the mobile machine 100, which may be a part of the instructions In for implementing the navigation and collision avoidance of the mobile machine 100 or a submodule separated from the instructions $I_c$ or other submodules of the navigation module 121. The collision avoidance submodule 1211 may further have data (e.g., input/output data and temporary data) related to the collision avoidance of the mobile machine 100 which may be stored in the one or more memories and accessed by the processing unit 110. In other embodiments, the navigation module 121 may be a navigation unit communicating with the processing unit 110, the storage unit 120, and the control unit 130 over the one or more communication buses or signal lines L, and may further include one or more memories (e.g., high-speed random access memory and non-transitory memory) for storing the instructions $I_n$ and the collision avoidance submodule 1211, and one or more processors (e.g., MPU and MCU) for executing the stored instructions $I_n$ and $I_c$ to implement the navigation and collision avoidance of the mobile machine 100.

The mobile machine 100 may further include sensors S (not shown) for detecting the environment in which it is located to realize its navigation. The sensors S communicate with the control unit 130 over one or more communication buses or signal lines that may be the same or at least partially different from the above-mentioned one or more communication buses or signal lines L. In other embodiments, in the case that the navigation module 121 is the above-mentioned navigation unit, the sensors S may communicate with the navigation unit instead over one or more communication buses or signal lines that may be the same or at least partially different from the above-mentioned one or more communication buses or signal lines L.

The mobile machine 100 may further include a camera set 131, a communication subunit 132 and an actuation subunit 133. The camera set 131, the communication subunit 132 and the actuation subunit 133 communicate with the control unit 130 over one or more communication buses or signal lines that may be the same or at least partially different from the above-mentioned one or more communication buses or signal lines L.

The camera set 131 is for capturing still images or video of the environment in which the mobile machine 100 is located, which may include one or more cameras (e.g., a common camera and an infrared camera). The communication subunit 132 is coupled to communication interface of the mobile machine 100, for example, network interface(s) 1321 for the mobile machine 100 to communicate with another device such as a remote control or a smart phone via a network (e.g., a wireless network) and I/O interface(s) 1322 (e.g., a physical button), and the like. The actuation subunit 133 is coupled to component/device for implementing the motions of the mobile machine 100 by, for example, actuating motor(s) of wheels W or joint(s) J. The communication subunit 132 may include controller(s) for the above-mentioned communication interface of the mobile machine 100, and the actuation subunit 133 may include controller(s) for the above-mentioned component/device for implementing the motions of the mobile machine 100. In other embodiments, the communication subunit 132 and/or actuation subunit 133 may just abstract component for representing the logical relationships between the components of the mobile machine 100.

The various components shown in FIG. 1A and FIG. 1B may be implemented in hardware, software or a combination of both hardware and software. In some embodiments, two or more of the processing unit 110, the storage unit 120, the control unit 130, the navigation module 121, and other units/subunits/modules may be implemented on a single chip or a circuit. In other embodiments, at least a part of them may be implemented on separate chips or circuits.

Figure 2:
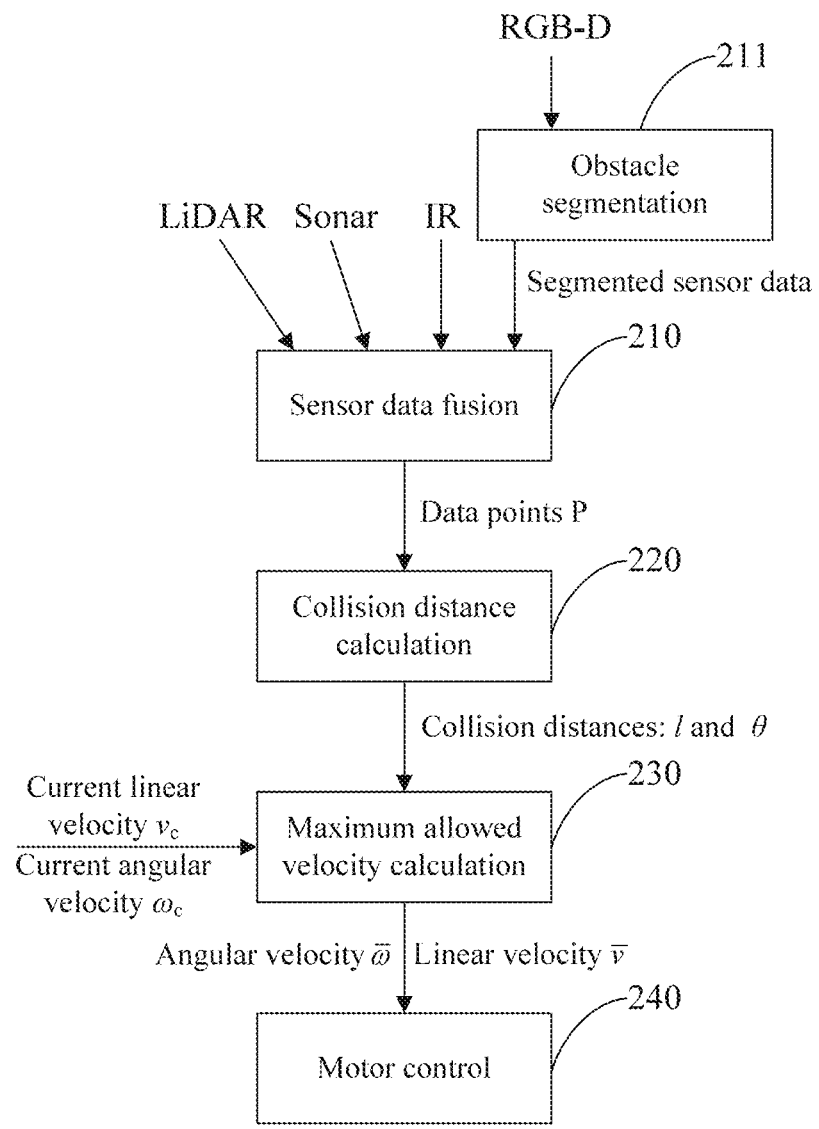
FIG. 2 is a schematic block diagram of implementing collision avoidance in the mobile machine of FIG. 1A.

FIG. 2 is a schematic block diagram of implementing the collision avoidance in the mobile machine 100 of FIG. 1A. In some embodiments, a collision avoidance method for the mobile machine 100 is implemented in the mobile machine 100 to avoid the mobile machine 100 from colliding with a collision object C (see FIG. 6B and FIG. 7B) such as a human, a vehicle, a garbage, or other obstacle by, for example, storing (sets of) instructions $I_c$ corresponding to the collision avoidance method as the collision avoidance submodule 1211 in the one or more memories of the navigation module 121 and executing the stored instructions $I_c$ through the one or more processors of the navigation module 121.

According to the collision avoidance method, the processing unit 110 fuses sensor data received from the sensors S to obtain data points P corresponding to the object C (block 210). In some embodiments, the sensors S may include an RGB-D camera $S_1$, a LiDAR $S_2$, sonars $S_3$, and infrared range finders (IRs) $S_4$. A fusion algorithms such as Kalman filter can be used to fuse the received sensor data so as to, for example, reduce uncertainties due to noisy data, to fuse data with different rates, and to combine data for same objects. As an example, in the case that the mobile machine 100 detects a person (i.e., the object C) standing in front, the LiDAR $S_2$ detects legs of the person in the data rate of 40 Hz and the RGB-D camera $S_1$ detect the body of the person in the data rate of 15 Hz, and Kalman filter is used to fuse the sensor data of the LiDAR $S_2$ and the RGB-D camera $S_1$ to output the data points P (e.g., a set of two dimensional (2D) points) in the data rate of 40 Hz.

In some embodiments, in order to facilitate the detection of the moving object C such as a moving person, the sensor data received form the RGB-D camera $S_1$ (or other depth camera) may be segmented by, for example, generating a (rectangular) tight bounding box that fits the shape of the object C and projecting the bounding box to a 2D plane parallel with a ground plane so as to obtain segmented sensor data (which is discretized into 2D points) corresponding to the object C before being fused (block 211), and then the segmented sensor data and the sensor data received from the other sensors may be fused to obtain the data points P corresponding to the object C (block 210).

The processing unit 110 further calculates a closed-form solution (i.e., analytical solution) of a distance (i.e., the collision distance) between the mobile machine 100 and each of the data points P (block 220) to obtain the distances between the mobile machine 100 and all the data points P. In some embodiments, the distance includes a distance l between a collision point Q and the corresponding data point P, and an angle θ between the collision point Q and the corresponding data point P with respect to a rotation center O (see FIG. 6B and FIG. 7B), where the distance l and angle θ are expressed in equations and jointly form the closed-form solution of the distance between the mobile machine 100 and each of the data points P.

The processing unit 110 further calculates a maximum allowed velocity of the mobile machine 100 based on the shortest distance between the mobile machine 100 and the data points P and a current velocity of the mobile machine 100 (block 230) among the obtained distances between the mobile machine 100 and all the data points P. In some embodiments, the maximum allowed velocity includes a maximum allowed linear velocity $\bar{v}$ and a maximum allowed angular velocity $\bar{\omega}$, and the current velocity includes a current linear velocity $v_c$ and a current angular velocity $\omega_c$.

The processing unit 110 further controls the mobile machine 100 to move according to the maximum allowed velocity (e.g., the maximum allowed linear velocity $\bar{v}$ and the maximum allowed angular velocity $\bar{\omega}$) (block 240). In some embodiments, the processing unit 110 may subscribe a current velocity of motor(s) of each of the wheels W from odometer(s) of the wheels W and transmit a velocity instruction generated according to the current velocity of motor(s) of each of the wheels W and the maximum allowed velocity (e.g., a decelerate instruction in the case that the current velocity is larger than the maximum allowed velocity) which may be in form of electronic signal to controller(s) (e.g., PID controller) of the motor(s) so as to control the wheels W to rotate according to the velocity instruction, so that the mobile machine 100 moves in accordance with the maximum allowed linear velocity $\bar{v}$ and the maximum allowed angular velocity $\bar{\omega}$ to avoid colliding with the object C. In other embodiments, for a mobile machine with legs, for example, a biped robot with two legs, the processing unit 110 may subscribe a current velocity of motor(s) of the joint(s) J of each of the legs and transmit a velocity instruction generated according to the current velocity of motor(s) of each of the joint(s) J and the maximum allowed velocity to controller(s) of the motor(s) so as to control the joint(s) J to rotate according to the velocity instruction, so that the mobile machine moves in accordance with the maximum allowed linear velocity $\bar{v}$ and the maximum allowed angular velocity $\bar{\omega}$ to avoid colliding with the object C.

Figure 3:
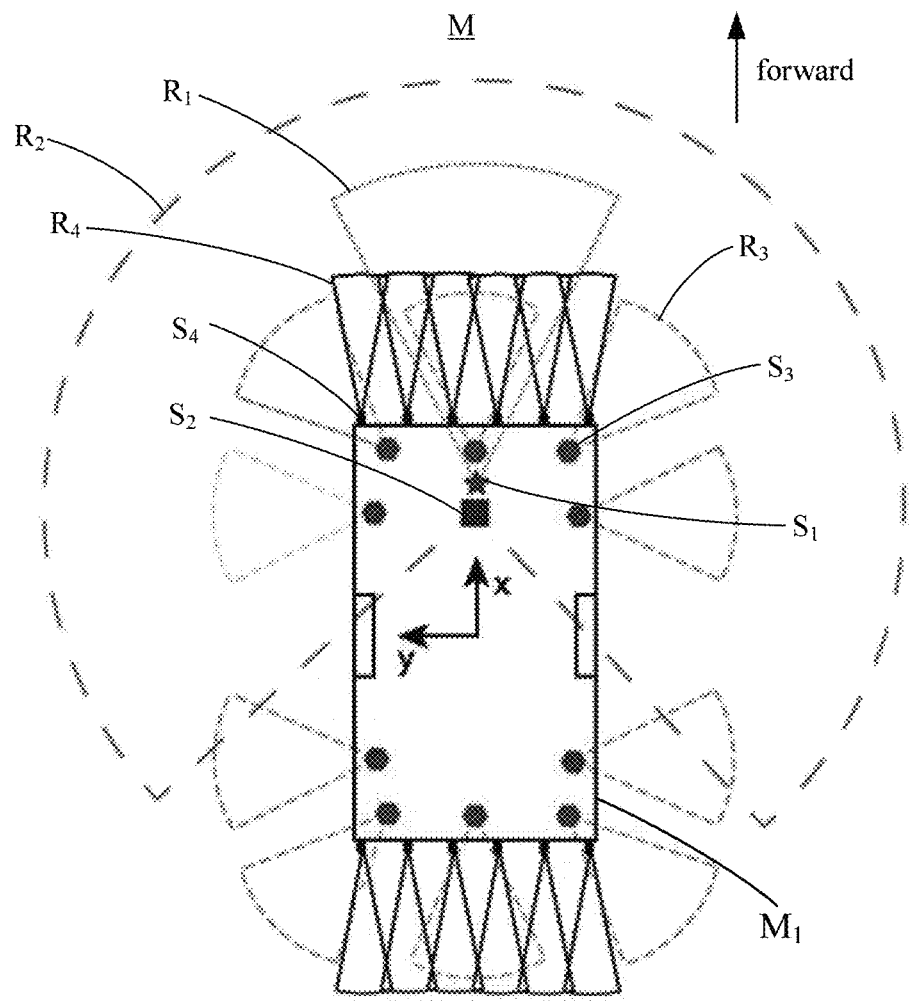
FIG. 3 is a schematic diagram of the arrangement of sensors on a mobile machine according to some embodiments of the present disclosure.

FIG. 3 is a schematic diagram of the arrangement of sensors on a mobile machine M according to some embodiments of the present disclosure. In some embodiments, in the mobile machine M (the mobile machine 100 of FIG. 1 as well), there are sensors namely a RGB-D camera $S_1$, a LiDAR $S_2$, five sonars $S_3$, and six IRs $S_4$ which installed on a front side of the mobile machine M so as to detect the object C when, for example, the mobile machine M moves forward. The RGB-D camera $S_1$ may be beneficial to detect small objects with rich features or obvious outlines (e.g., mobile phone and a puddle of water on the carpet), and suspended objects with bigger upper part than lower part, for example, for a table with four legs, the RGB-D camera $S_1$ can recognize the surface of the table while the LiDAR $S_2$ can only detect the four legs without knowing there is a surface in above. The sonars $S_3$ may be beneficial to detect transparent objects (e.g., glass and acrylic), dark objects (e.g., objects in black color), and reflective obstacles (e.g., mirrors). The IRs $S_4$ may be beneficial to detect small obstacles over 5 cm height. In other embodiments, the number of the above-mentioned sensors in the sensors S may be changed according to actual needs, and the sensors S may include a part of the above-mentioned kinds of sensors (e.g., the RGB-D camera $S_1$, the LiDAR $S_2$, and the sonars $S_3$) and may include other kinds of sensors (e.g., radar).

In some embodiments, the RGB-D camera $S_1$ is installed at a middle part of the front side to faces a forward direction of the mobile machine M (see FIG. 1A) so as to shoot depth images that may be three dimensional (3D) images within a range $R_1$ in front of mobile machine M, thereby beneficial to detect the object C which is small in size. The LiDAR $S_2$ is installed at a lower part of the front side to faces the forward direction of the mobile machine M (see FIG. 1A) so as to collect LiDAR data that may be a 2D array within a range $R_2$ in front, diagonal front, aside, and diagonal rear of mobile machine M, thereby beneficial to detect the object C which is opaque with light color within a wider range. The five sonars $S_3$ are installed at the middle and lower parts of the front side with certain intervals therebetween (see FIG. 1A), where each of the sonars $S_3$ collects sonar data that may be a 2D point within a range $R_3$, so that the five sonars jointly collect the sonar data of the ranges $R_3$ in front, diagonal front, and aside of mobile machine M, thereby beneficial to detect the object C which is transparent. The six IRs $S_4$ are installed in line at a bottom edge of the front side with certain intervals therebetween (see FIG. 1A), where each of the IRs $S_4$ collects range data that may be a 2D point within a range $R_4$ in front of mobile machine M, thereby beneficial to detect the object C which is opaque with light color and shorter in height.

In addition to the five sonars $S_3$ and six IRs $S_4$ installed on the front side of the mobile machine M, there are five sonars $S_3$ and six IRs $S_4$ installed on a back side of the mobile machine M so as to detect the object C when, for example, the mobile machine M moves backward. In other embodiments, the kind, the arrangement, and the number of the sensors S on the mobile machine M that are for detecting the environment in which the mobile machine M is located to realize its navigation may be changed according to actual needs, for example, the camera set 131 installed at the upper part of the front side may be taken as one of the sensors S to shoot images/videos so as to detect the object C which is farer away, six or more sonars $S_3$ may be installed at the front side to shorten the intervals therebetween so that the gap between the ranges $R_3$ of two adjacent sonars $S_3$ can be narrowed so as to improve the detection effect.

Figure 4:
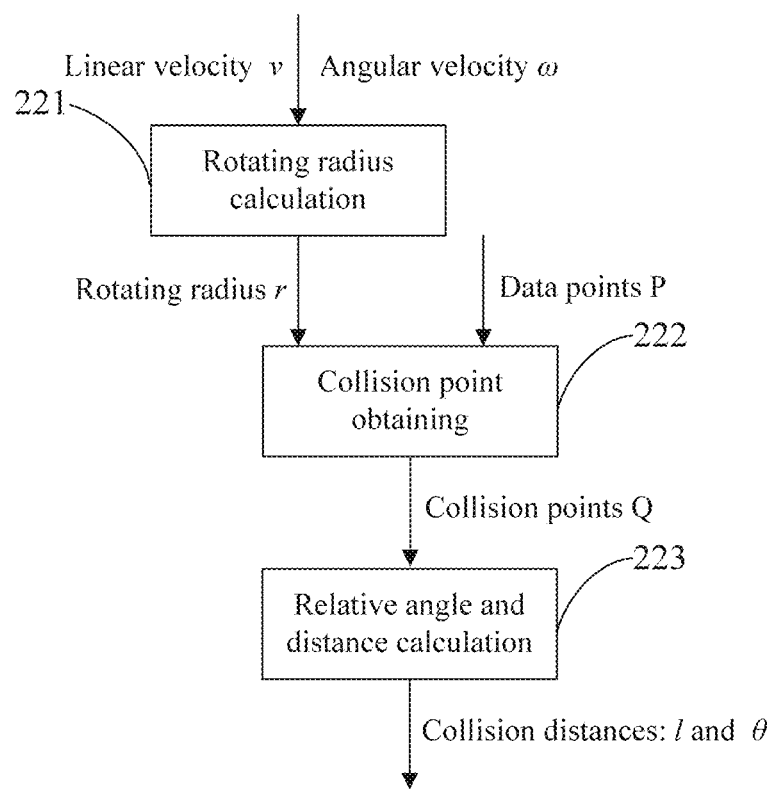
FIG. 4 is a schematic block diagram of calculating a collision distance in the collision avoidance of FIG. 2.

FIG. 4 is a schematic block diagram of calculating the collision distance in the collision avoidance of FIG. 2. For calculating the collision distance (block 220 of FIG. 2), in some embodiments, the processing unit 110 may calculate a rotating radius r of the mobile machine 100 through dividing a linear velocity v by an angular velocity ω (i.e., r=υ/w) (block 221), obtain the collision point Q of the mobile machine 100 corresponding to each of the data points P based on the rotating radius r (block 222), that is, the collision points Q corresponding to all the data points P will be obtained, and calculate the angle θ between the collision point Q and the corresponding data point P with respect to the rotation center O (see FIG. 6B) (O=(0,r)) based on the rotating radius r and calculate the distance l between the collision point Q and the corresponding data point P by multiplying the angle θ and the distance h between the rotation center O and the corresponding data point P (i.e., l=θh) (block 223), that is, the angle θ and the distance l corresponding to all the data points P will be obtained. In some embodiments, the linear velocity v may be obtained by, for example, fusing data received from an accelerometer of the mobile machine 100, the above-mentioned current velocity subscribed from the odometer(s) of the wheels W, and a (LiDAR-based) simultaneous localization and mapping (SLAM) result. The angular velocity co may be obtained by, for example, fusing data received from an inertial measurement unit (IMU) of the mobile machine 100 and the above-mentioned current velocity subscribed from the odometer(s) of the wheels W.

Figure 5:
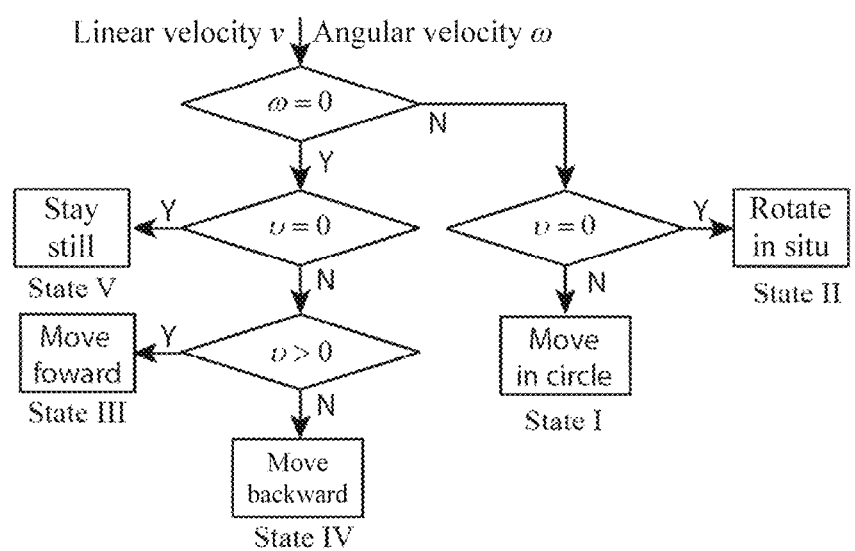
FIG. 5 is a schematic block diagram of motion states of the mobile machine of FIG. 1A.

FIG. 5 is a schematic block diagram of motion states of the mobile machine 100 of FIG. 1A. The mobile machine 100 has five states corresponding to different linear velocities v and angular velocities u of the mobile machine 100. In some embodiments, when calculating the collision distance (block 220 of FIG. 2), the processing unit 110 may first determine a motion state of the mobile machine 100 which corresponds to the current motion (e.g., stopped, rotating, and moving forwardly/backwardly) of the mobile machine 100 based on the linear velocity v and the angular velocity ω of the mobile machine 100, then determine the method (depends on the motion state of the mobile machine 100, see FIG. 6A and FIG. 7A) to obtain the collision point Q (block 222 of FIG. 4) and calculate the relative angle θ and distance l (block 223 of FIG. 4) based on the determined motion state, so as to facilitate the collision distance calculation (block 220 of FIG. 2). If both the linear velocity v and the angular velocity ω are not 0, the mobile machine 100 is determined as in motion state I, that is, moving in a circle; if the linear velocity v is 0 and the angular velocity ω is not 0, the mobile machine 100 is determined as in state II, that is, rotating in situ; if the linear velocity v larger than 0 and the angular velocity ω is 0, the mobile machine 100 is determined as in state III, that is, moving forward; if the linear velocity v smaller than 0 and the angular velocity ω is 0, the mobile machine 100 is determined as in state IV, that is, moving backward; and if both the linear velocity v and the angular velocity ω are 0, the mobile machine 100 is determined as in state V, that is, staying still.

Collision Distance Calculation: for Mobile Machine with Circular Footprint

The calculation of collision distance will vary depending on the "footprint" of a mobile machine, where the footprint may be the contour of the mobile base (or the chassis) of the mobile machine. For example, for the mobile machine 100 having a circular mobile base (or chassis, see FIG. 1A), it has a circular footprint 101 (see FIG. 6A), and for the mobile machine M having a rectangular mobile base (or chassis, see FIG. 3), it has a rectangular footprint $M_1$ (see FIG. 3). The footprint of the mobile machine can be determined by, for example, taking the contour of the mobile base (or the chassis) of the mobile machine shown on the design drawing of the mobile machine as the footprint, or analyzing the photo of the top view of the mobile base (or the chassis) of the mobile machine to determine the contour of the mobile base (or the chassis) and take the determined contour as the footprint. In some embodiments, for safety, the footprint may be defined (slightly) larger than the real contour of the mobile base (or chassis) of the mobile machine according to, for example, the size, the weight, and/or the maximum speed of the mobile machine. As an example, the larger the size, the weight, and/or the maximum speed of the mobile machine, the larger the footprint defined.

Figure 6A:
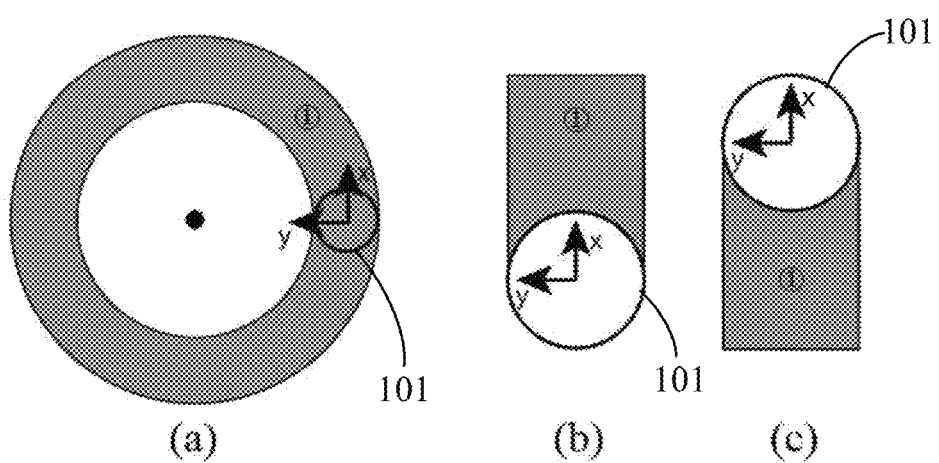
FIG. 6A is a schematic diagram of the movements of the mobile machine of FIG. 1A that has a circular footprint.
Figure 6B:
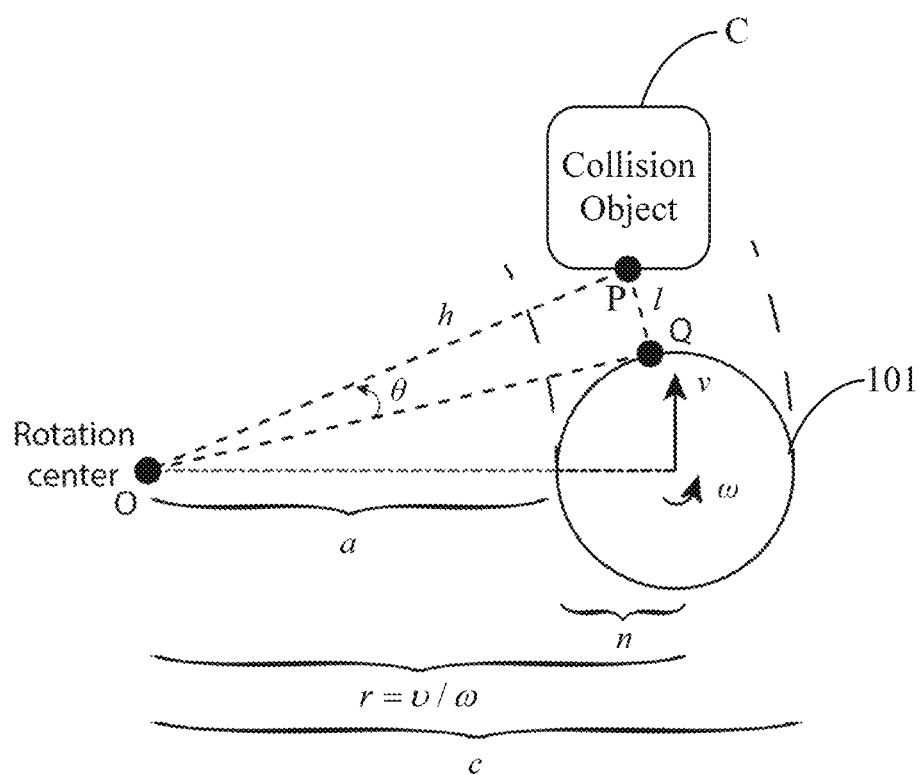
FIG. 6B is a schematic diagram of the calculation of a collision point in the movement of the mobile machine of FIG. 1A that has a circular footprint.

FIG. 6A is a schematic diagram of the movements of the mobile machine 100 of FIG. 1A that has the circular footprint 101 (and another mobile machine that has an ellipse footprint). In state I, the mobile machine 100 is moving in a circle as shown in part (a) of FIG. 6A and it will only collide with the data points P in area ①, hence the data points P outside area ① will be ignored. FIG. 6B is a schematic diagram of the calculation of the collision point Q in the movement of the mobile machine 100 of FIG. 1A that has the circular footprint 101 (and the above-mentioned mobile machine that has the ellipse footprint). For obtaining the collision point Q (block 222 of FIG. 4) of the mobile machine 100 with the circular footprint 101 (or the above-mentioned mobile machine that has the ellipse footprint) in state I, in some embodiments, the processing unit 110 may calculate a shortest distance a between the rotation center O and the circular footprint 101 of the mobile machine 100 through an equation of:

$$a=|r-\mathrm{sgn}(r)n|;$$

where, r is the rotating radius of the mobile machine 100, and n is a radius of the circular footprint 101.

The processing unit 110 may further calculate a longest distance c between the rotation center O and the circular footprint 101 of the mobile machine 100 through an equation of:

$$c=|r+\mathrm{sgn}(r)n|.$$

The processing unit 110 may further calculate a distance h between the rotation center O and the corresponding data point P through an equation of:

$$h=\sqrt{(p_x+r)^2+p_y^2};$$

where, $p_x$ is the x coordinate of the corresponding data point P, $p_y$ is the y coordinate of the corresponding data point P.

The processing unit 110 may further calculate coordinates ($q_x$, $q_y$) of the collision point Q in response to h≥a and h≤c (i.e., for the data point P in area ① of part (a) of FIG. 6A), through an equation of:

$$(q_x, q_y) = \left(\frac{h^2-n^2-r^2}{2r}, sgn(v)\sqrt{n^2-q_y^2}\right);$$

where, v is the linear velocity of the mobile machine 100.

Figure 6C:
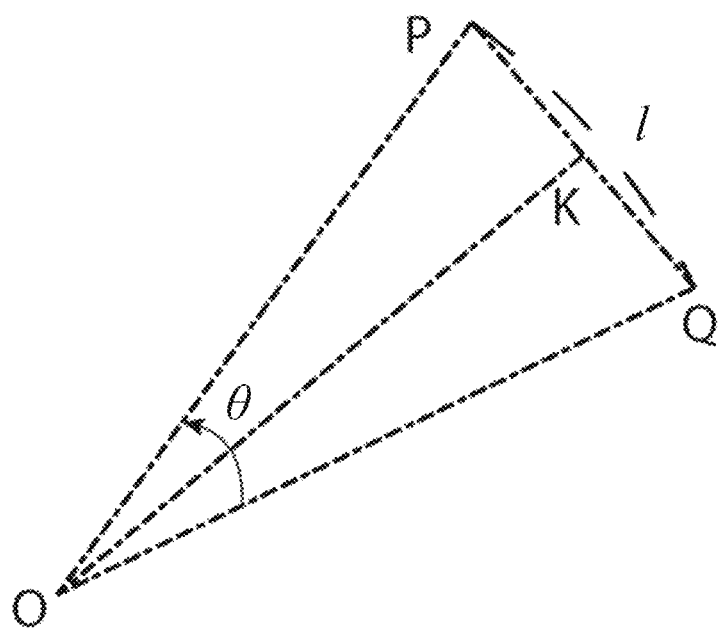
FIG. 6C is a schematic diagram of the calculation of a midpoint between the collision point and the corresponding data point in the movement of the mobile machine of FIG. 1A that has a circular footprint.

FIG. 6C is a schematic diagram of the calculation of a midpoint K between the collision point Q and the corresponding data point P in the movement of the mobile machine 100 of FIG. 1A that has the circular footprint 101 (and the above-mentioned mobile machine that has the ellipse footprint). For calculating the relative angle θ and distance l (block 223 of FIG. 4) of the mobile machine 100 with the circular footprint 101 (or the above-mentioned mobile machine that has the ellipse footprint), in some embodiments, the processing unit 110 may calculate coordinates ($k_x$, $k_y$) of the midpoint K between the collision point Q and the corresponding data point P through an equation of:

$$(k_x,k_y)=((p_x+q_x)/2,(p_y+q_y)/2);$$

where, $q_x$ is the x coordinate of the collision point, and $q_y$ is the y coordinate of the collision point.

The processing unit 110 may further calculate the angle θ between the collision point Q and the corresponding data point P with respect to the rotation center O through an equation of:

$$\theta = 2\arctan\left(\frac{\sqrt{(p_x-k_x)^2+(p_y-k_y)^2}}{\sqrt{k_x^2+(k_y-r)^2}}\right);$$

where, $k_x$ is the x coordinate of the midpoint K, and $k_y$ is the y coordinate of the midpoint K.

The processing unit 110 may further calculate the distance l between the collision point Q and the corresponding data point P through an equation of:

$$l=\theta h.$$

In state II, the mobile machine 100 is rotating in situ and no collision will occur, hence no collision avoidance is needed (and all the data points P may be ignored).

In state III, the mobile machine 100 is moving forward as shown in part (b) of FIG. 6A and it will only collide with the data points P in area ①, hence the data points P outside area ① will be ignored. The processing unit 110 may calculate coordinates ($q_x$, $q_y$) of the collision point Q in response to −n≤$p_y$≤n and $p_x$≥$\sqrt{n^2-p_y^2}$ (i.e., for the data point P in area ① of part (b) of FIG. 6A), through an equation of:

$$(q_x,q_y)=(\sqrt{n^2-p_y^2},p_y).$$

The processing unit 110 may further set the angle θ between the collision point Q and the corresponding data point P with respect to the rotation center O as ∞.

The processing unit 110 may further calculate the distance l between the collision point Q and the corresponding data point P through an equation of:

$$l=P_x-q_x.$$

In state IV, the mobile machine 100 is moving back as shown in part (c) of FIG. 6A and it will only collide with the data points P in area ①, hence the data points P outside area ① will be ignored. The processing unit 110 may calculate coordinates ($q_x$, $q_y$) of the collision point Q in response to −n≤$p_y$≤n and $p_x$≤−$\sqrt{n^2-p_y^2}$ (i.e., for the data point P in area ① of part (c) of FIG. 6A), through an equation of:

$$(q_x,q_y)=(-\sqrt{n^2-p_y^2},p_y).$$

The processing unit 110 may further set the angle θ between the collision point Q and the corresponding data point P with respect to the rotation center O as ∞.

The processing unit 110 may further calculate the distance l between the collision point Q and the corresponding data point P through an equation of:

$$l=q_x-p_x.$$

In state V, the mobile machine 100 is staying in a place and no collision will occur, hence no collision avoidance is needed (and all the data points P may be ignored).

Figure 7A:
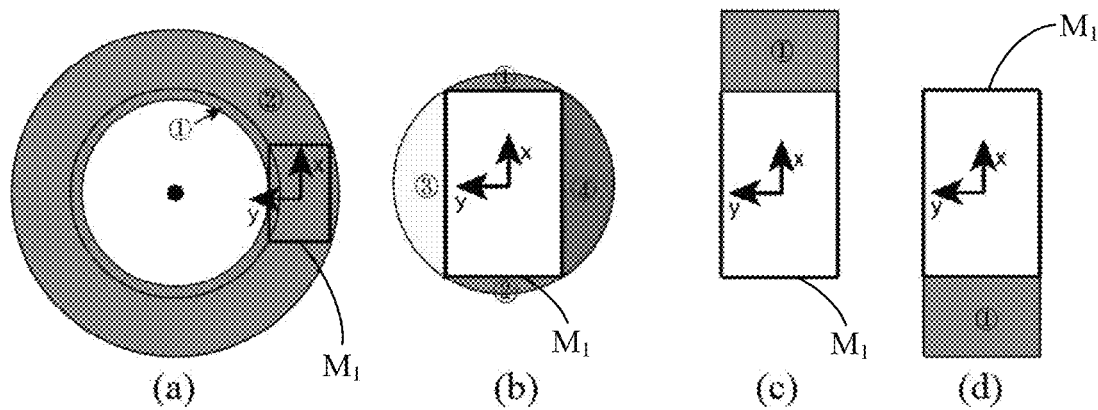
FIG. 7A is a schematic diagram of the movements of the mobile machine of FIG. 3 that has a rectangular footprint.
Figure 7B:
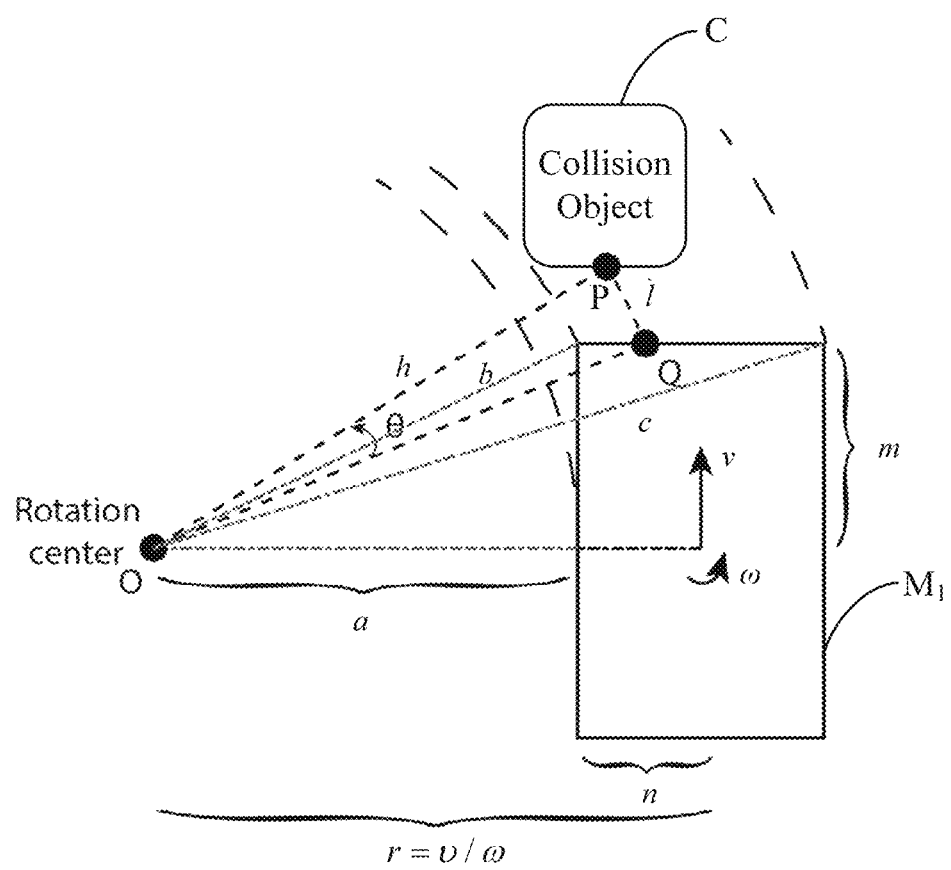
FIG. 7B is a schematic diagram of the calculation of a collision point in the movement of the mobile machine of FIG. 3 that has a rectangular footprint.

Collision Distance Calculation: for Mobile Machine with Rectangular Footprint FIG. 7A is a schematic diagram of the movements of the mobile machine M of FIG. 3 that has the rectangular footprint $M_1$ (and another mobile machine that has a footprint of other polygon such as square, trapezoid, and pentagon). In state I, the mobile machine M is moving in a circle as shown in part (a) of FIG. 7A and it will only collide with the data points P in areas ① and ②, hence the data points P outside areas ① and ② will be ignored. FIG. 7B is a schematic diagram of the calculation of a collision point Q in the movement of the mobile machine M of FIG. 3 that has the rectangular footprint $M_1$ (and the above-mentioned mobile machine that has the footprint of other polygon). For obtaining the collision point Q (block 222 of FIG. 4) of the mobile machine M with the rectangular footprint $M_1$ (or the above-mentioned mobile machine that has the footprint of other polygon) in state I, in some embodiments, the processing unit 110 may calculate a distance a between the rotation center O and a closest side of the rectangular footprint $M_1$ of the mobile machine M through an equation of:

$$a=|r-sgn(r)n|;$$

where, n is a half width of the rectangular footprint $M_1$.

The processing unit 110 may further calculate a shortest distance b between the rotation center O and corners of the rectangular footprint $M_1$ of the mobile machine M through an equation of:

$$b=\sqrt{m^2+(r-sgn(r)n)^2};$$

where, m is a half length of the rectangular footprint $M_1$.

The processing unit 110 may further calculate a longest distance c between the rotation center O and the corners of the rectangular footprint of the mobile machine through an equation of:

$$c=\sqrt{m^2+(r+sgn(r)n)^2}.$$

The processing unit 110 may further calculate coordinates $(q_x, q_y)$ of the collision point Q in response to h≥a and h<b (i.e., for the data point P in area ① of part (a) of FIG. 7A), through an equation of:

$$(q_x, q_y) = (\text{sgn}(v)\sqrt{h^2 - (q_y - r)^2}, \text{sgn}(r)n).$$

The processing unit 110 may further calculate coordinates $(q_x, q_y)$ of the collision point Q in response to b and h c (i.e., for the data point P in area ② of part (a) of FIG. 7A), through an equation of:

$$(q_x, q_y) = (\text{sgn}(v)m, r + \text{sgn}(r)\sqrt{h^2 - q_x^2});$$

where, v is the linear velocity of the mobile machine M.

In state II, the mobile machine M is rotating in situ as shown in part (b) of FIG. 7A and it will only collide with the data points P in areas ①, ②, ③, and ④, hence the data points P outside areas ①, ②, ③, and ④ will be ignored. For obtaining the collision point Q (block 222 of FIG. 4) of the mobile machine M with the rectangular footprint $M_1$ (or the above-mentioned mobile machine that has the footprint of other polygon) in state II, in some embodiments, the processing unit 110 may calculate coordinates $(q_x, q_y)$ of the collision point in response to $p_x \geq m$ and $-n \leq p_y \leq n$ (i.e., for the data point P in area ① of part (b) of FIG. 7A), through an equation of:

$$(q_x, q_y) = (m, -\text{sgn}(\omega)\sqrt{h^2 - m^2});$$

where, ω is the angular velocity of the mobile machine M.

The processing unit 110 may further calculate coordinates $(q_x, q_y)$ of the collision point in response to $p_x \leq -m$ and $-n \leq p_y \leq n$ (i.e., for the data point P in area ② of part (b) of FIG. 7A), through an equation of:

$$(q_x, q_y) = (-m, \text{sgn}(\omega)\sqrt{h^2 - m^2}).$$

The processing unit 110 may further calculate coordinates $(q_x, q_y)$ of the collision point in response to $-m \leq p_x \leq m$ and $p_y \geq n$ (i.e., for the data point P in area ③ of part (b) of FIG. 7A), through an equation of:

$$(q_x, q_y) = (\text{sgn}(\omega)\sqrt{h^2 - n^2}, n).$$

The processing unit 110 may further calculate coordinates $(q_x, q_y)$ of the collision point in response to $-m \leq p_x \leq m$ and $p_y \leq -n$ (i.e., for the data point P in area ④ of part (b) of FIG. 7A), through an equation of:

$$(q_x, q_y) = (-\text{sgn}(\omega)\sqrt{h^2 - n^2}, -n).$$

In sates I and II, for calculating the relative angle θ and distance l (block 223 of FIG. 4) of the mobile machine M with the rectangular footprint $M_1$ (or the above-mentioned mobile machine that has the footprint of other polygon), in some embodiments, the processing unit 110 may calculate coordinates $(k_x, k_y)$ between a midpoint K (see FIG. 6C) of the collision point Q and the corresponding data point P through an equation of:

$$(k_x, k_y) = ((p_x + q_x)/2, (p_y + q_y)/2);$$

where, $p_x$ is the x coordinate of the corresponding data point P, $q_x$ is the x coordinate of the collision point Q, $p_y$ is the y coordinate of the corresponding data point P, and $q_y$ is the y coordinate of the collision point Q.

The processing unit 110 may further calculate the angle θ between the collision point Q and the corresponding data point P with respect to a rotation center O through an equation of:

$$\theta = 2\arctan\left(\frac{\sqrt{(p_x - k_x)^2 + (p_y - k_y)^2}}{\sqrt{k_x^2 + (k_y - r)^2}}\right);$$

where, $k_x$ is the x coordinate of the midpoint K, $k_y$ is the y coordinate of the midpoint K, and r is the rotating radius of the mobile machine M.

The processing unit 110 may further calculate the distance l between the collision point Q and the corresponding data point P through an equation of:

$$l = \theta h.$$

In state III, the mobile machine M is moving forward as shown in part (c) of FIG. 7A and it will only collide with the data points P in area ①, hence the data points P outside area ① will be ignored. The processing unit 110 may calculate coordinates $(q_x, q_y)$ of the collision point Q in response to $p_x \geq m$ and $-n \leq p_y \leq n$ (i.e., for the data point P in area ① of part (c) of FIG. 7A), through an equation of:

$$(q_x, q_y) = (m, p_y).$$

The processing unit 110 may further set the angle θ between the collision point Q and the corresponding data point P with respect to the rotation center O as ∞.

The processing unit 110 may further calculate the distance l between the collision point Q and the corresponding data point P through an equation of:

$$l = p_x - q_x.$$

In state IV, the mobile machine M is moving back as shown in part (d) of FIG. 7A and it will only collide with the data points P in area ①, hence the data points P outside area ① will be ignored. The processing unit 110 may calculate coordinates $(q_x, q_y)$ of the collision point Q in response to $p_x \geq m$ and $-n \leq p_y \leq n$ (i.e., for the data point P in area ① of part (d) of FIG. 7A), through an equation of:

$$(q_x, q_y) = (-m, p_y).$$

The processing unit 110 may further set the angle θ between the collision point Q and the corresponding data point P with respect to the rotation center O as ∞.

The processing unit 110 may further calculate the distance l between the collision point Q and the corresponding data point P through an equation of:

$$l = q_x - p_x.$$

It should be noted that, all the calculated distances l and angles θ are expressed in equations rather than numeric, hence each distance l and its corresponding angle θ jointly form the closed-form solution of the distance between the mobile machine 100 and each data point P. In some embodiments, in order to prevent colliding with the moving object C such as a moving person, after segmenting the sensor data to obtain the segmented sensor data corresponding to the object C (block 211 of FIG. 2), the processing unit 110 may estimate a velocity of the object C based on the segmented sensor data and predict a trajectory of the object C based on the velocity, and before calculating the collision distance (block 220 of FIG. 2), the processing unit 110 may add a closest point in the predicted trajectory to the plurality of data points, so that the closest point in the predicted trajectory of the object C can also be considered when calculating the collision distance (block 220 of FIG. 2).

Figure 8:
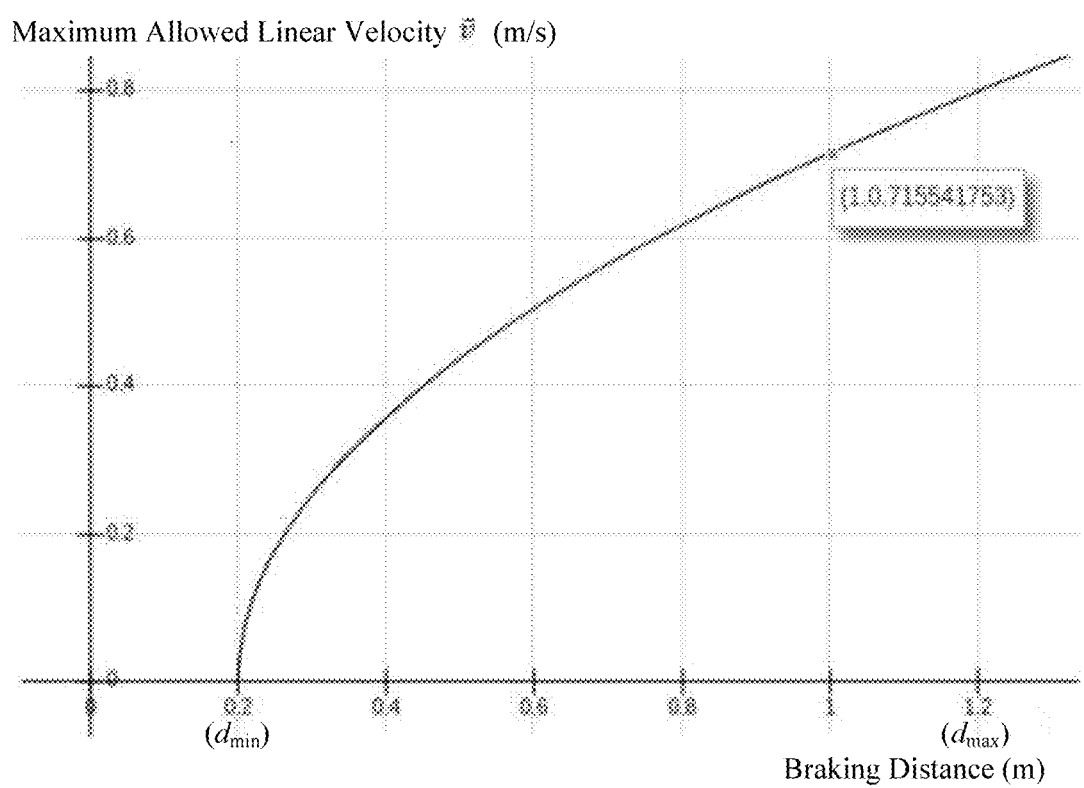
FIG. 8 is a schematic diagram of the effect of a function for calculating maximum allowed linear velocity in the collision avoidance of FIG. 2.

For calculating the maximum allowed velocity (block 230 of FIG. 2), in some embodiments, the processing unit 110 may obtain the shortest distance l between the mobile machine 100 and the data points P, and calculates a maximum allowed linear velocity $\bar{v}$ through an equation of:

$$\bar{v} = \sqrt{l-d}/(v_c - d);$$

where, $v_c$ is the current linear velocity of the mobile machine, $d = d_{max} - d_{min}$, $d_{max}$ is the max effect range (e.g., $d_{max} = 1.2$m), and $d_{min}$ is the minimum effect range (e.g., $d_{min} = 0.2$m). Only the data points P within the effect range d will be considered. FIG. 8 is a schematic diagram of the effect of the above-mentioned equation $\bar{v} = \sqrt{l-d}/(v_c - d)$ in the collision avoidance of FIG. 2. For the braking distance of 1 meter, the maximum allowed linear velocity $\bar{v}$ should be 0.715541753 m/s. The maximum allowed linear velocity $\bar{v}$ depends on the required braking distance of the mobile machine 100. For example, for the braking distance of 0.2 meter or less, the maximum allowed linear velocity v should be 0 m/s. In some embodiments, the braking distance of the mobile machine 100 may be defined according to, for example, the size, and/or the maximum speed of the mobile machine 100. As an example, the larger the size, and/or the maximum speed of the mobile machine 100, the larger the braking distance defined.

The processing unit 110 may further calculate a maximum allowed angular velocity $\bar{\omega}$ through an equation of:

$$\bar{\omega} = \sqrt{\theta - \varphi}/(\omega_c - \varphi);$$

where, $\omega_c$ is the current angular velocity of the mobile machine, $\varphi = \varphi_{max} - \varphi_{min}$, $\varphi_{max}$ is the max effect range (e.g., $\varphi_{max} = 0.5$ rad), and $\varphi_{min}$ is the minimum effect range (e.g., $\varphi_{min} = 0$ rad). Only the data points P within the effect range will be considered.

In accordance with the test in experiments, if the mobile machine 100 is controlled to move according to the calculated maximum allowed linear velocity $\bar{v}$ (see FIG. 8) and the maximum allowed angular velocity $\bar{\omega}$, it can stop in the required braking distance without collision with the small object C over 5 cm height (e.g., jacket, towel, and small packages) and the above-mentioned suspended object C with 0.6-0.8m height of surface (e.g., tables and chairs).

The benefits of the collision avoidance method in FIG. 2 are as follows. First, it can work with a variety kinds of sensors to improve the detection perception and accuracy of the mobile machine 100 on diverse kinds of obstacles including small, transparent, suspended, moving, and static obstacles by combines multiple sensor data. Second, it reduces the response time of the mobile machine 100 on collision avoidance while saves computation resources, because the calculation process of collision distance uses a closed-form solution (i.e., analytical solution) instead of numerical solution which is more complex. Third, it realizes collision avoidance on the mobile machine 100 while ensuring smooth movement of the mobile machine 100 by modeling the current velocity of the mobile machine 100 as a significant factor to determine the maximum allowed velocity. Fourth, it realizes high system robustness by fusing sensor data to reduce uncertainties on detection. Fifth, it can be implemented on a concise structure and is easy to be implemented and maintained.

The collision avoidance method in FIG. 2 can be implemented on a mobile machine in widely fields, for example, indoors or outsides, or in different scenes such as hospitals, factories, warehouse, malls, and streets. In some embodiments, the mobile machine may be any kind of ground vehicle, for example, unicycle/car-like robot or omnidirectional mobile robot. It endows the mobile machine ability to avoid colliding with obstacles such as people, cars, animals, bumps, walls, and furniture in an effective manner.

It can be understood by those skilled in the art that, all or part of the method in the above-mentioned embodiment(s) (e.g., the collision avoidance of FIG. 2) can be implemented by one or more computer programs to instruct related hardware. In addition, the one or more programs can be stored in a non-transitory computer readable storage medium. When the one or more programs are executed, all or part of the corresponding method in the above-mentioned embodiment(s) is performed. Any reference to a storage, a memory, a database or other medium may include non-transitory and/or transitory memory. Non-transitory memory may include read only memory (ROM), programmable ROM (PROM), electrically programmable ROM (EPROM), electrically erasable programmable ROM (EEPROM), flash memory, solid-state drive (SSD), or the like. Volatile memory may include random access memory (RAM), external cache memory, or the like.

The processing unit 110 (and the above-mentioned processor) may include central processing unit (CPU), or be other general purpose processor, digital signal processor (DSP), application specific integrated circuit (ASIC), field-programmable gate array (FPGA), or be other programmable logic device, discrete gate, transistor logic device, and discrete hardware component. The general purpose processor may be microprocessor, or the processor may also be any conventional processor. The storage unit 120 (and the above-mentioned memory) may include internal storage unit such as hard disk and internal memory. The storage unit 120 may also include external storage device such as plug-in hard disk, smart media card (SMC), secure digital (SD) card, and flash card.

The exemplificative units/modules and methods/steps described in the embodiments may be implemented through software, hardware, or a combination of software and hardware. Whether these functions are implemented through software or hardware depends on the specific application and design constraints of the technical schemes. The above-mentioned collision avoidance method and mobile machine may be implemented in other manners. For example, the division of units/modules is merely a logical functional division, and other division manner may be used in actual implementations, that is, multiple units/modules may be combined or be integrated into another system, or some of the features may be ignored or not performed. In addition, the above-mentioned mutual coupling/connection may be direct coupling/connection or communication connection, and may also be indirect coupling/connection or communication connection through some interfaces/devices, and may also be electrical, mechanical or in other forms.

The above-mentioned embodiments are merely intended for describing but not for limiting the technical schemes of the present disclosure. Although the present disclosure is described in detail with reference to the above-mentioned embodiments, the technical schemes in each of the above-mentioned embodiments may still be modified, or some of the technical features may be equivalently replaced, so that these modifications or replacements do not make the essence of the corresponding technical schemes depart from the spirit and scope of the technical schemes of each of the embodiments of the present disclosure, and should be included within the scope of the present disclosure.

What is claimed is:

1. A method for a mobile machine to avoid collision with an object, wherein the mobile machine has a plurality of sensors, and the method comprises:
at one or more processors of the mobile machine,
fusing sensor data received from the plurality of sensors to obtain a plurality of data points corresponding to the object;
calculating a closed-form solution of a distance between the mobile machine and each of the plurality of data points;
calculating a maximum allowed velocity of the mobile machine based on the shortest distance between the mobile machine and the plurality of data points and a current velocity of the mobile machine; and
controlling the mobile machine to move according to the maximum allowed velocity;
wherein one of the plurality of sensors is a depth camera; and
the fusing sensor data received from the plurality of sensors to obtain the plurality of data points corresponding to the object comprises:
segmenting the sensor data received from the depth camera to obtain segmented sensor data corresponding to the object;
estimating a velocity of the object based on the segmented sensor data, and predicting a trajectory of the object based on the velocity;
fusing the segmented sensor data and the sensor data received from the other of the plurality of sensors to obtain the plurality of data points corresponding to the object; and
adding a closest point in the predicted trajectory to the plurality of data points.

2. The method of claim 1, wherein the calculating the closed-form solution of the distance between the mobile machine and each of the plurality of data points comprises:
calculating a rotating radius of the mobile machine through dividing a linear velocity of the mobile machine by an angular velocity of the mobile machine;
obtaining a collision point of the mobile machine corresponding to each of the plurality of data points based on the rotating radius; and
calculating an angle between the collision point and the corresponding data point with respect to a rotation center based on the rotating radius, and calculating a distance between the collision point and the corresponding data point by multiplying the angle and a distance between the rotation center and the corresponding data point.

3. The method of claim 2, wherein:
the calculating the angle between the collision point and the corresponding data point with respect to the rotation center based on the rotating radius comprises:
calculating a shortest distance a between the rotation center and a circular footprint of the mobile machine through an equation of:

$a=|r-\text{sgn}(r)n|;$ where, r is the rotating radius of the mobile machine, and n is a radius of the circular footprint;
calculating a longest distance c between the rotation center and the circular footprint of the mobile machine through an equation of:

$c=|r-\text{sgn}(r)n|;$ calculating a distance h between the rotation center and the corresponding data point through an equation of:

$h=\sqrt{(p_x+r)^2+p_y^2};$ where, $p_x$, is the x coordinate of the corresponding data point, $p_y$ is the y coordinate of the corresponding data point;
calculating coordinates ($q_x$, $q_y$) of the collision point in response to h≥a and h≤c, through an equation of:

$$(q_x, q_y) = \left( \frac{h^2 - n^2 - r^2}{2r}, \text{sgn}(v)\sqrt{n^2 - q_y^2} \right);$$

where, v is the linear velocity of the mobile machine;
calculating coordinates ($k_x$, $k_y$) of a midpoint between the collision point and the corresponding data point through an equation of:

$(k_x,k_y)=((p_x+q_x)/2,(p_y+q_y)/2);$ where, $q_x$ is the x coordinate of the collision point, and $q_y$ is the y coordinate of the collision point; and
calculating the angle θ between the collision point and the corresponding data point with respect to the rotation center through an equation of:

$$\theta = 2\arctan\left( \frac{\sqrt{(p_x - k_x)^2 + (p_y - k_y)^2}}{\sqrt{k_x^2 + (k_y - r)^2}} \right);$$

where, $k_c$ is the x coordinate of the midpoint, and $k_y$ is the y coordinate of the midpoint; and
the calculating the distance between the collision point and the corresponding data point by multiplying the angle and the distance between the rotation center and the corresponding data point comprises:
calculating the distance l between the collision point and the corresponding data point through an equation of:

$l=\theta h.$

4. The method of claim 2, wherein:
the calculating the angle between the collision point and the corresponding data point with respect to the rotation center based on the rotating radius comprises:
calculating coordinates ($k_x$, $k_y$) of a midpoint between the collision point and the corresponding data point through an equation of:

$(k_x,k_y)=((p_x+q_x)/2,(p_y+q_y)/2);$ where, $p_x$ is the x coordinate of the corresponding data point, $q_x$ is the x coordinate of the collision point, $p_y$ is they coordinate of the corresponding data point, and $q_y$ is the y coordinate of the collision point; and
calculating the angle θ between the collision point and the corresponding data point with respect to the rotation center through an equation of:

$$\theta = 2\arctan\left( \frac{\sqrt{(p_x - k_x)^2 + (p_y - k_y)^2}}{\sqrt{k_x^2 + (k_y - r)^2}} \right);$$

where, $k_x$ is the x coordinate of the midpoint, $k_y$ is they coordinate of the midpoint, and r is the rotating radius of the mobile machine; and the calculating the distance between the collision point and the corresponding data point by multiplying the angle and the distance between the rotation center and the corresponding data point comprises:
calculating a distance h between the rotation center and the corresponding data point through an equation of:

$$h=\sqrt{(p_x+r)^2+p_y^2};$$

calculating the distance l between the collision point and the corresponding data point through an equation of:

$$l=\theta h.$$

5. The method of claim 4, wherein:
the obtaining the collision point of the mobile machine corresponding to each of the plurality of data points based on the rotating radius comprises:
in response to the linear velocity being not 0:
calculating a distance a between the rotation center and a closest side of a rectangular footprint of the mobile machine through an equation of:

$$a=|r-\text{sgn}(r)n|;$$

where, n is a half width of the rectangular footprint;
calculating a shortest distance b between the rotation center and corners of the rectangular footprint of the mobile machine through an equation of:

$$b=\sqrt{m^2+(r-\text{sgn}(r)n)^2};$$

where, n is a half length of the rectangular footprint;
calculating a longest distance c between the rotation center and the corners of the rectangular footprint of the mobile machine through an equation of:

$$c=\sqrt{m^2+(r+\text{sgn}(r)n)^2};$$

calculating coordinates $(q_x, q_y)$ of the collision point in response to h≥a and h<b, through an equation of:

$$(q_x,q_y)=(\text{sgn}(v)\sqrt{h^2-(q_y-r)^2},\text{sgn}(r)n);\text{ and}$$

calculating coordinates $(q_x, q_y)$ of the collision point in response to h≥b and h≤c, through an equation of:

$$(q_x,q_y)=(\text{sgn}(v)m,r+\text{sgn}(r)\sqrt{h^2-q_x^2});$$

where, v is the linear velocity of the mobile machine; and
in response to the linear velocity being 0:
calculating coordinates $(q_x, q_y)$ of the collision point in response to $p_x \geq m$ and $-n \leq p_y \leq n$, through an equation of:

$$(q_x,q_y)=(m,-\text{sgn}(\omega)\sqrt{h^2-m^2});$$

where, ω is the angular velocity of the mobile machine;
calculating coordinates $(q_x, q_y)$ of the collision point in response to $p_x \leq -m$ and $-n \leq p_y \leq n$, through an equation of:

$$(q_x,q_y)=(-m,\text{sgn}(\omega)\sqrt{h^2-m^2});$$

calculating coordinates $(q_x, q_y)$ of the collision point in response to $-m \leq p_x \leq m$ and $p_y \geq n$, through an equation of:

$$(q_x,q_y)=(\text{sgn}(\omega)\sqrt{h^2-n^2},n);\text{ and}$$

calculating coordinates $(q_x, q_y)$ of the collision point in response to $-m \leq p_x \leq m$ and $p_y \leq -n$, through an equation of:

$$(q_x,q_y)=(-\text{sgn}(\omega)\sqrt{h^2-n^2},n).$$

6. The method of claim 1, wherein the calculating the closed-form solution of the distance between the mobile machine and each of the plurality of data points comprises:
determining a motion state of the mobile machine based on a linear velocity and an angular velocity of the mobile machine; and
calculating the closed-form solution of the distance between the mobile machine and each of the plurality of data points according to the motion state.

7. The method of claim 1, wherein the calculating the maximum allowed velocity of the robot based on the shortest distance between the mobile machine and the plurality of data points and the current velocity of the mobile machine comprises:
obtaining the shortest distance l between the mobile machine and the plurality of data points;
calculating a maximum allowed linear velocity $\bar{v}$ through an equation of:

$$\bar{v}=\sqrt{l-d}/(v_c-d);$$

where, $v_c$ is a current linear velocity of the mobile machine 10, $d=d_{max}-d_{min}$, $d_{max}$ is the max effect range, and $d_{min}$ is the minimum effect range; and
calculating a maximum allowed angular velocity $\bar{\omega}$ through an equation of:

$$\bar{\omega}=\sqrt{\theta-\varphi}/(\omega_c-\varphi);$$

where, $\omega_c$ is a current angular velocity of the mobile machine 100, $\varphi=\varphi_{max}-\varphi_{min}$, $\varphi_{max}$ is the max effect range, and $\varphi_{min}$ is the minimum effect range.

8. A mobile machine, comprising:
a plurality of sensors;
one or more processors; and
memory storing one or more programs configured to be executed by the one or more processors, wherein the one or more programs comprise:
instructions for fusing sensor data received from the plurality of sensors to obtain a plurality of data points corresponding to an object;
instructions for calculating a closed-form solution of a distance between the mobile machine and each of the plurality of data points;
instructions for calculating a maximum allowed velocity of the mobile machine based on the shortest distance between the mobile machine and the plurality of data points and a current velocity of the mobile machine; and
instructions for controlling the mobile machine to move according to the maximum allowed velocity;
wherein the instructions for calculating the closed-form solution of the distance between the mobile machine and each of the plurality of data points comprise:
instructions for determining a motion state of the mobile machine based on a linear velocity and an angular velocity of the mobile machine; and
instructions for calculating the closed-form solution of the distance between the mobile machine and each of the plurality of data points according to the motion state.

9. The mobile machine of claim 8, wherein the instructions for calculating the closed-form solution of the distance between the mobile machine and each of the plurality of data points further comprise:
instructions for calculating a rotating radius of the mobile machine through dividing a linear velocity of the mobile machine by an angular velocity of the mobile machine;

instructions for obtaining a collision point of the mobile machine corresponding to each of the plurality of data points based on the rotating radius; and instructions for calculating an angle between the collision point and the corresponding data point with respect to a rotation center based on the rotating radius, and calculating a distance between the collision point and the corresponding data point by multiplying the angle and a distance between the rotation center and the corresponding data point.

10. The mobile machine of claim 9, wherein:

the calculating the angle between the collision point and the corresponding data point with respect to the rotation center based on the rotating radius comprises:

calculating a shortest distance a between the rotation center and a circular footprint of the mobile machine through an equation of:

$$a=|r-\text{sgn}(r)n|;$$

where, r is the rotating radius of the mobile machine, and n is a radius of the circular footprint;

calculating a longest distance c between the rotation center and the circular footprint of the mobile machine through an equation of:

$$c=|r-\text{sgn}(r)n|;$$

calculating a distance h between the rotation center and the corresponding data point through an equation of:

$$h=\sqrt{(p_x+r)^2+p_y^2};$$

where, $p_x$ is the x coordinate of the corresponding data point, $p_y$ is the y coordinate of the corresponding data point;

calculating coordinates ($q_x$, $q_y$) of the collision point in response to h≥a and h≤c, through an equation of:

$$(q_x, q_y) = \left(\frac{h^2 - n^2 - r^2}{2r}, \text{sgn}(v)\sqrt{n^2 - q_y^2}\right);$$

where, v is the linear velocity of the mobile machine;

calculating coordinates ($k_x$, $k_y$) of a midpoint between the collision point and the corresponding data point through an equation of:

$$(k_x,k_y)=((p_x+q_x)/2,(p_y+q_y)/2);$$

where, $q_x$ is the x coordinate of the collision point, and $q_y$ is the y coordinate of the collision point; and calculating the angle θ between the collision point and the corresponding data point with respect to the rotation center through an equation of:

$$\theta = 2\arctan\left(\frac{\sqrt{(p_x - k_x)^2 + (p_y - k_y)^2}}{\sqrt{k_x^2 + (k_y - r)^2}}\right);$$

where, $k_x$ is the x coordinate of the midpoint, and $k_y$ is the y coordinate of the midpoint; and the calculating the distance between the collision point and the corresponding data point by multiplying the angle and the distance between the rotation center and the corresponding data point comprises:

calculating the distance l between the collision point and the corresponding data point through an equation of:

$$l=\theta h.$$

11. The mobile machine of claim 9, wherein:

the calculating the angle between the collision point and the corresponding data point with respect to the rotation center based on the rotating radius comprises:

calculating coordinates ($k_x$, $k_y$) of a midpoint between the collision point and the corresponding data point through an equation of:

$$(k_x,k_y)=((p_x+q_x)/2,(p_y+q_y)/2);$$

where, $p_x$ is the x coordinate of the corresponding data point, $q_x$ is the x coordinate of the collision point, $p_y$ is they coordinate of the corresponding data point, and $q_y$ is the y coordinate of the collision point; and calculating the angle θ between the collision point and the corresponding data point with respect to the rotation center through an equation of:

$$\theta = 2\arctan\left(\frac{\sqrt{(p_x - k_x)^2 + (p_y - k_y)^2}}{\sqrt{k_x^2 + (k_y - r)^2}}\right);$$

where, $k_x$ is the x coordinate of the midpoint, $k_y$ is they coordinate of the midpoint, and r is the rotating radius of the mobile machine; and the calculating the distance between the collision point and the corresponding data point by multiplying the angle and the distance between the rotation center and the corresponding data point comprise:

calculating a distance h between the rotation center and the corresponding data point through an equation of:

$$h=\sqrt{(p_x+r)^2+p_y^2};$$

calculating the distance l between the collision point and the corresponding data point through an equation of:

$$l=\theta h.$$

12. The mobile machine of claim 11, wherein:

the obtaining the collision point of the mobile machine corresponding to each of the plurality of data points based on the rotating radius comprises:

in response to the linear velocity being not 0:

calculating a distance a between the rotation center and a closest side of a rectangular footprint of the mobile machine through an equation of:

$$a=|r-\text{sgn}(r)n|;$$

where, n is a half width of the rectangular footprint;

calculating a shortest distance b between the rotation center and corners of the rectangular footprint of the mobile machine through an equation of:

$$b=\sqrt{m^2+(r-\text{sgn}(r)n)^2};$$

where, n is a half length of the rectangular footprint;

calculating a longest distance c between the rotation center and the corners of the rectangular footprint of the mobile machine through an equation of:

$$c=\sqrt{m^2+(r+\text{sgn}(r)n)^2};$$

calculating coordinates ($q_x$, $q_y$) of the collision point in response to h≥a and h<b, through an equation of:

$$(q_x,q_y)=(\text{sgn}(v)\sqrt{h^2-(q_y-r)^2},\text{sgn}(r)n);\text{ and}$$

calculating coordinates ($q_x$, $q_y$) of the collision point in response to h≥b and h≤c, through an equation of:

$$(q_x,q_y)=(\text{sgn}(v)m,r+\text{sgn}(r)\sqrt{h^2-q_x^2});$$

where, v is the linear velocity of the mobile machine; and
in response to the linear velocity being 0:
calculating coordinates $(q_x, q_y)$ of the collision point in response to $p_x \geq m$ and $-n \leq p_y \leq n$, through an equation of:

$$(q_x, q_y) = (m, -\text{sgn}(\omega)\sqrt{h^2 - m^2});$$

where, $\omega$ is the angular velocity of the mobile machine;
calculating coordinates $(q_x, q_y)$ of the collision point in response to $p_x \leq -m$ and $-n \leq p_y \leq n$, through an equation of:

$$(q_x, q_y) = (-m, \text{sgn}(\omega)\sqrt{h^2 - m^2});$$

calculating coordinates $(q_x, q_y)$ of the collision point in response to $-m \leq p_x \leq m$ and $p_y \geq n$, through an equation of:

$$(q_x, q_y) = (\text{sgn}(\omega)\sqrt{h^2 - n^2}, n); \text{ and}$$

calculating coordinates $(q_x, q_y)$ of the collision point in response to $-m \leq p_x \leq m$ and $p_y \leq -n$, through an equation of:

$$(q_x, q_y) = (-\text{sgn}(\omega)\sqrt{h^2 - n^2}, -n);$$

13. The mobile machine of claim 8, wherein one of the plurality of sensors is a depth camera; and
the fusing sensor data received from the plurality of sensors to obtain the plurality of data points corresponding to the object comprises:
segmenting the sensor data received from the depth camera to obtain segmented sensor data corresponding to the object;
estimating a velocity of the object based on the segmented sensor data, and predicting a trajectory of the object based on the velocity;
fusing the segmented sensor data and the sensor data received from the other of the plurality of sensors to obtain the plurality of data points corresponding to the object; and
adding a closest point in the predicted trajectory to the plurality of data points.

14. The mobile machine of claim 8, wherein the calculating the maximum allowed velocity of the robot based on the shortest distance between the mobile machine and the plurality of data points and the current velocity of the mobile machine comprises:
obtaining the shortest distance l between the mobile machine and the plurality of data points;
calculating a maximum allowed linear velocity $\bar{v}$ through an equation of:

$$\bar{v} = \sqrt{l - d}/(v_c - d);$$

where, $v_c$ is a current linear velocity of the mobile machine 10, $d = d_{max} - d_{min}$, $d_{max}$ is the max effect range, and $d_{min}$ is the minimum effect range; and
calculating a maximum allowed angular velocity $\bar{\omega}$ through an equation of:

$$\bar{\omega} = \sqrt{\theta - \varphi}/(\omega_c - \varphi);$$

where, $\omega_c$ is a current angular velocity of the mobile machine 100, $\varphi = \varphi_{max} - \varphi_{min}$ is the max effect range, and $\omega_{min}$ is the minimum effect range.

15. A non-transitory computer readable storage medium storing one or more programs, wherein the one or more programs comprise instructions, which when executed by a mobile machine having a plurality of sensors, cause the mobile machine to:
fuse sensor data received from the plurality of sensors to obtain a plurality of data points corresponding to an object;
calculate a closed-form solution of a distance between the mobile machine and each of the plurality of data points;
calculate a maximum allowed velocity of the mobile machine based on the shortest distance between the mobile machine and the plurality of data points and a current velocity of the mobile machine; and
control the mobile machine to move according to the maximum allowed velocity;
wherein when the instructions are executed by the mobile machine, further causing the mobile machine to:
calculate a rotating radius of the mobile machine through dividing a linear velocity of the mobile machine by an angular velocity of the mobile machine;
obtain collision point of the mobile machine corresponding to each of the plurality of data points based on the rotating radius; and
calculate an angle between the collision point and the corresponding data point with respect to a rotation center based on the rotating radius, and calculate a distance between the collision point and the corresponding data point by multiplying the angle and a distance between the rotation center and the corresponding data point.

16. The storage medium of claim 15, wherein:
the calculating the angle between the collision point and the corresponding data point with respect to the rotation center based on the rotating radius comprises:
calculating a shortest distance a between the rotation center and a circular footprint of the mobile machine through an equation of:

$$a = |r - \text{sgn}(r)n|;$$

where, r is the rotating radius of the mobile machine, and n is a radius of the circular footprint;
calculating a longest distance c between the rotation center and the circular footprint of the mobile machine through an equation of:

$$c = |r + \text{sgn}(r)n|;$$

calculating a distance h between the rotation center and the corresponding data point through an equation of:

$$h = \sqrt{(p_x + r)^2 + p_y^2}; \text{ and}$$

where, $p_x$ is the x coordinate of the corresponding data point, $p_y$ is the y coordinate of the corresponding data point;
calculating coordinates $(q_x, q_y)$ of the collision point in response to $h \geq a$ and $h \leq c$, through an equation of:

$$(q_x, q_y) = \left(\frac{h^2 - n^2 - r^2}{2r}, \text{sgn}(v)\sqrt{n^2 - q_y^2}\right);$$

where, v is the linear velocity of the mobile machine;
calculating coordinates $(k_x, k_y)$ of a midpoint between the collision point and the corresponding data point through an equation of:

$$(k_x, k_y) = ((p_x + q_x)/2, (p_y + q_y)/2);$$

where, $q_x$ is the x coordinate of the collision point, and $q_y$ is the y coordinate of the collision point; and calculating the angle θ between the collision point and the corresponding data point with respect to the rotation center through an equation of:

$$\theta = 2\arctan\left(\frac{\sqrt{(p_x-k_x)^2+(p_y-k_y)^2}}{\sqrt{k_x^2+(k_y-r)^2}}\right);$$

where, $k_x$ is the x coordinate of the midpoint, and $k_y$ is the y coordinate of the midpoint; and the calculating a distance between the collision point and the corresponding data point by multiplying the angle and a distance between the rotation center and the corresponding data point comprises:

calculating the distance l between the collision point and the corresponding data point through an equation of:

$$l=\theta h.$$

17. The storage medium of claim 15, wherein:
the calculating the angle between the collision point and the corresponding data point with respect to the rotation center based on the rotating radius comprises:
calculating coordinates ($k_x$, $k_y$) of a midpoint between the collision point and the corresponding data point through an equation of:

$$(k_x,k_y)=((p_x+q_x)/2,(p_y+q_y)/2);$$

where, $p_x$ is the x coordinate of the corresponding data point, $q_x$ is the x coordinate of the collision point, $p_y$ is they coordinate of the corresponding data point, and $q_y$ is the y coordinate of the collision point; and calculating the angle θ between the collision point and the corresponding data point with respect to the rotation center through an equation of:

$$\theta = 2\arctan\left(\frac{\sqrt{(p_x-k_x)^2+(p_y-k_y)^2}}{\sqrt{k_x^2+(k_y-r)^2}}\right);$$

where, $k_x$ is the x coordinate of the midpoint, $k_y$ is they coordinate of the midpoint, and r is the rotating radius of the mobile machine; and the calculating the distance between the collision point and the corresponding data point by multiplying the angle and the distance between the rotation center and the corresponding data point comprises:

calculating a distance h between the rotation center and the corresponding data point through an equation of:

$$h=\sqrt{(p_x+r)^2+p_y^2};\text{ and}$$

calculating the distance l between the collision point and the corresponding data point through an equation of:

$$l=\theta h.$$

18. The storage medium of claim 15, wherein when the instructions are executed by the mobile machine, further causing the mobile machine to:
determine a motion state of the mobile machine based on a linear velocity and an angular velocity of the mobile machine; and
calculate the closed-form solution of the distance between the mobile machine and each of the plurality of data points according to the motion state.

19. The storage medium of claim 15, wherein one of the plurality of sensors is a depth camera; and wherein when the instructions are executed by the mobile machine, further causing the mobile machine to:
segment the sensor data received from the depth camera to obtain segmented sensor data corresponding to the object;
estimate a velocity of the object based on the segmented sensor data, and predicting a trajectory of the object based on the velocity;
fuse the segmented sensor data and the sensor data received from the other of the plurality of sensors to obtain the plurality of data points corresponding to the object; and
add a closest point in the predicted trajectory to the plurality of data points.

20. The storage medium of claim 15, wherein when the instructions are executed by the mobile machine, further causing the mobile machine to:
obtain the shortest distance l between the mobile machine and the plurality of data points;
calculate a maximum allowed linear velocity $\bar{v}$ through an equation of:

$$\bar{v}=\sqrt{l-d}/(v_c-d);$$

wherein, $v_c$ is a current linear velocity of the mobile machine 10, $d=d_{max}-d_{min}$, $d_{max}$ is the max effect range, and $d_{min}$ is the minimum effect range; and
calculate a maximum allowed angular velocity $\bar{\omega}$ through an equation of:

$$\bar{\omega}=\sqrt{\theta-\varphi}/(\omega_c-\varphi);$$

wherein, $\omega_c$ is a current angular velocity of the mobile machine 100, $\varphi=\varphi_{max}-\varphi_{min}$, $\varphi_{max}$ is the max effect range, and $\varphi_{min}$ is the minimum effect range.

* * * * *